United States Patent
Chu et al.

(10) Patent No.: US 9,782,679 B1
(45) Date of Patent: *Oct. 10, 2017

(54) INTERFACE-BASED GAME-SPACE CONTEST GENERATION

(71) Applicant: KABAM, INC., San Francisco, CA (US)

(72) Inventors: Yuexin Chu, San Francisco, CA (US); Alex Genco, San Francisco, CA (US); Jason Lee, San Francisco, CA (US); Clive Henrick, Castro Valley, CA (US); Matthew Curtis, Novato, CA (US); Kellen Christopher Smalley, Dublin, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,516

(22) Filed: Sep. 8, 2014

Related U.S. Application Data

(63) Continuation of application No. 13/847,981, filed on Mar. 20, 2013, now Pat. No. 8,831,758.

(51) Int. Cl.
*A63F 13/70* (2014.01)
*A63F 13/79* (2014.01)
(Continued)

(52) U.S. Cl.
CPC ............ *A63F 13/70* (2014.09); *A63F 13/79* (2014.09); *A63F 13/798* (2014.09);
(Continued)

(58) Field of Classification Search
CPC ...... G07F 17/3276; A63F 13/70; A63F 13/79; A63F 13/798; A63F 2300/55; A63F 2300/5546; A63F 2300/558
See application file for complete search history.

(56) References Cited

U.S. PATENT DOCUMENTS

| 5,816,918 A | 10/1998 | Kelly et al. ............... 463/16 |
| 5,933,813 A | 8/1999 | Teicher |

(Continued)

FOREIGN PATENT DOCUMENTS

| KR | 1020130137431 | 12/2013 |
| WO | WO 2013/059639 | 4/2013 |

(Continued)

OTHER PUBLICATIONS

Quest item—WoWWiki—Your guide to the World of Warcraft <URL: http://www.wowwiki.com/Quest_Item> Retrieved on Apr. 16, 2014, 1 page.
(Continued)

*Primary Examiner* — William H McCulloch, Jr.
(74) *Attorney, Agent, or Firm* — Sheppard Mullin Richter & Hampton LLP

(57) ABSTRACT

An approach to facilitating interface-based game-space contest generation is provided. A user interface may be provided to an administrator. The user interface may be configured to receive user inputs from the administrator that include one or more performance criteria to be associated with a contest to be provided in a game space, one or more awards to be distributed in association with the contest, and one or more qualifications to participate in the contest. A notification that relates to the contest may be provided, based on the user inputs, in the game space. Performance scores of users that participated in the contest may be determined based on the performance criteria and activities that are performed in the game space by the participating users. Automated distribution of the awards to individual ones of the participating users may be facilitated in accordance with the performance scores of the individual participating users.

18 Claims, 4 Drawing Sheets

(51) Int. Cl.
*A63F 13/798* (2014.01)
*G07F 17/32* (2006.01)

(52) U.S. Cl.
CPC ...... *G07F 17/3276* (2013.01); *A63F 2300/55* (2013.01); *A63F 2300/558* (2013.01); *A63F 2300/5546* (2013.01)

(56) References Cited

U.S. PATENT DOCUMENTS

| | | |
|---|---|---|
| 5,964,660 A | 10/1999 | James |
| 6,142,472 A | 11/2000 | Kliebisch |
| 6,190,225 B1 | 2/2001 | Coleman |
| 6,402,619 B1 | 6/2002 | Sato |
| 6,604,008 B2 | 8/2003 | Chudley |
| 6,745,236 B1 | 6/2004 | Hawkins |
| 6,850,900 B1 | 2/2005 | Hare |
| 6,928,474 B2 | 8/2005 | Venkatesan |
| 7,050,868 B1 | 5/2006 | Graepel |
| 7,076,453 B2 | 7/2006 | Jammes |
| 7,156,733 B2 | 1/2007 | Chiang |
| 7,192,352 B2 | 3/2007 | Walker |
| 7,197,352 B2 | 3/2007 | Gott |
| 7,326,115 B2 | 2/2008 | Baerlocher |
| 7,533,336 B2 | 5/2009 | Jaffe |
| 7,660,740 B2 | 2/2010 | Boone |
| 7,698,229 B2 | 4/2010 | Hsu |
| 7,813,821 B1 | 10/2010 | Howell |
| 7,819,749 B1 | 10/2010 | Fish et al. |
| 8,016,668 B2 | 9/2011 | Hardy |
| 8,066,571 B2 | 11/2011 | Koster et al. |
| 8,105,156 B2 | 1/2012 | Walker et al. |
| 8,147,340 B2 | 4/2012 | Brunet de Courssou et al. ............................ 463/42 |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf et al. ............ 463/20 |
| 8,231,470 B2 | 7/2012 | Feeney et al. ......... 463/42 |
| 8,246,439 B2 | 8/2012 | Kelly et al. |
| 8,272,934 B2 | 9/2012 | Olive et al. |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall et al. |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker et al. |
| 8,317,584 B2 | 11/2012 | Aoki et al. |
| 8,323,110 B2 | 12/2012 | Shibamiya et al. ............ 463/42 |
| 8,328,642 B2 | 12/2012 | Mosites et al. |
| 8,332,260 B1 | 12/2012 | Mysen |
| 8,332,544 B1 | 12/2012 | Ralls |
| 8,348,762 B2 | 1/2013 | Willis |
| 8,348,767 B2 | 1/2013 | Mahajan |
| 8,348,768 B2 | 1/2013 | Auterio et al. |
| 8,360,858 B2 | 1/2013 | LaRocca |
| 8,360,866 B2 | 1/2013 | VanLuchene |
| 8,360,867 B2 | 1/2013 | Van Luchene |
| 8,360,868 B2 | 1/2013 | Shvili ............ 463/27 |
| 8,366,544 B2 | 2/2013 | Walker |
| 8,366,550 B2 | 2/2013 | Herrmann et al. |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett et al. |
| 8,475,262 B2 | 7/2013 | Wolf et al. ............ 463/20 |
| 8,506,394 B2 | 8/2013 | Kelly et al. |
| 8,533,076 B2 | 9/2013 | Chu |
| 8,583,266 B2 | 11/2013 | Herbrich et al. |
| 8,636,591 B1 | 1/2014 | Hawk |
| 8,758,119 B1 | 6/2014 | BronsteinBendayan |
| 8,784,214 B2 | 7/2014 | Parks et al. |
| 8,821,260 B1 | 9/2014 | Desanti |
| 8,831,758 B1* | 9/2014 | Chu ................ A63F 13/85 3/85 |
| 8,843,557 B2 | 9/2014 | Ranade |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis et al. |
| 9,007,189 B1 | 4/2015 | Curtis et al. |
| 9,138,639 B1 | 9/2015 | Ernst |
| 9,256,887 B2 | 2/2016 | Santini |
| 9,257,007 B2 | 2/2016 | Santini |
| 9,259,642 B1 | 2/2016 | McNeill |
| 9,286,510 B2 | 3/2016 | Soohoo |
| 9,317,993 B2 | 4/2016 | Hardy |
| 9,375,636 B1 | 6/2016 | Wakeford |
| 9,403,093 B2 | 8/2016 | Harrington |
| 9,406,201 B2 | 8/2016 | Englman |
| 9,452,356 B1 | 9/2016 | Tsao |
| 9,452,364 B1 | 9/2016 | Curtis |
| 9,463,376 B1 | 10/2016 | Kim |
| 9,468,851 B1 | 10/2016 | Pieron |
| 9,610,503 B2 | 4/2017 | Pieron |
| 9,626,475 B1 | 4/2017 | Schultz |
| 9,656,174 B1 | 5/2017 | McLellan |
| 9,669,313 B2 | 6/2017 | Pieron |
| 9,682,314 B2 | 6/2017 | Kim |
| 2002/0023039 A1 | 2/2002 | Fritsch |
| 2002/0059397 A1 | 5/2002 | Feola |
| 2002/0094863 A1 | 7/2002 | Klayh |
| 2002/0095327 A1 | 7/2002 | Zumel |
| 2002/0115488 A1 | 8/2002 | Berry et al. |
| 2002/0119824 A1 | 8/2002 | Allen ............... 463/42 |
| 2002/0165794 A1 | 11/2002 | Ishihara |
| 2002/0183105 A1 | 12/2002 | Cannon et al. |
| 2002/0193162 A1 | 12/2002 | Walker et al. |
| 2003/0008713 A1 | 1/2003 | Ushiro et al. |
| 2003/0032476 A1 | 2/2003 | Walker |
| 2003/0157978 A1 | 8/2003 | Englman |
| 2003/0174178 A1 | 9/2003 | Hodges |
| 2003/0190960 A1 | 10/2003 | Jokipii et al. ............ 463/42 |
| 2004/0002387 A1 | 1/2004 | Grady |
| 2004/0068451 A1 | 4/2004 | Lenk |
| 2004/0143852 A1 | 7/2004 | Meyers |
| 2004/0199471 A1 | 10/2004 | Hardjono |
| 2004/0215524 A1 | 10/2004 | Parkyn |
| 2004/0224745 A1 | 11/2004 | Bregenzer |
| 2004/0225387 A1 | 11/2004 | Smith, III |
| 2004/0267611 A1 | 12/2004 | Hoerenz |
| 2005/0096117 A1 | 5/2005 | Katz et al. |
| 2005/0114223 A1 | 5/2005 | Schneider |
| 2005/0165686 A1 | 7/2005 | Zack |
| 2005/0255914 A1 | 11/2005 | McHale |
| 2006/0030407 A1 | 2/2006 | Thayer |
| 2006/0058103 A1* | 3/2006 | Danieli ............... A63F 13/12 463/42 |
| 2006/0100006 A1 | 5/2006 | Mitchell |
| 2006/0155597 A1 | 7/2006 | Gleason |
| 2006/0200370 A1 | 9/2006 | Ratliff |
| 2006/0217198 A1 | 9/2006 | Johnson |
| 2006/0287102 A1 | 12/2006 | White et al. ............ 463/42 |
| 2007/0021213 A1 | 1/2007 | Foe et al. |
| 2007/0077988 A1 | 4/2007 | Friedman |
| 2007/0105615 A1 | 5/2007 | Lind |
| 2007/0111770 A1 | 5/2007 | Van Luchene |
| 2007/0129147 A1 | 6/2007 | Gagner |
| 2007/0155485 A1 | 7/2007 | Cuddy et al. |
| 2007/0191101 A1* | 8/2007 | Coliz ............... A63F 13/12 463/42 |
| 2007/0191102 A1 | 8/2007 | Coliz et al. ............ 463/42 |
| 2007/0213116 A1 | 9/2007 | Crawford et al. ............ 463/16 |
| 2007/0233585 A1 | 10/2007 | Ben Simon |
| 2007/0281285 A1 | 12/2007 | Jayaweera |
| 2008/0004093 A1 | 1/2008 | Van Luchene |
| 2008/0032787 A1 | 2/2008 | Low |
| 2008/0076527 A1 | 3/2008 | Low |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo et al. |

(56) References Cited

U.S. PATENT DOCUMENTS

| | | |
|---|---|---|
| 2008/0194318 A1 | 8/2008 | Kralicky |
| 2008/0200260 A1 | 8/2008 | Deng ............................ 463/42 |
| 2008/0214295 A1 | 9/2008 | Dabrowski |
| 2008/0234043 A1 | 9/2008 | McCaskey |
| 2008/0268946 A1 | 10/2008 | Roemer |
| 2008/0275786 A1 | 11/2008 | Gluck |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0082099 A1 | 3/2009 | Luciano, Jr. et al. |
| 2009/0204907 A1 | 8/2009 | Finn |
| 2009/0208181 A1 | 8/2009 | Cottrell |
| 2009/0210301 A1 | 8/2009 | Porter |
| 2009/0234710 A1 | 9/2009 | Belgaied Hassine |
| 2009/0280905 A1 | 11/2009 | Weisman |
| 2009/0315893 A1 | 12/2009 | Smith et al. |
| 2010/0022307 A1 | 1/2010 | Steuer et al. |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney et al. ..................... 463/1 |
| 2010/0107214 A1 | 4/2010 | Ganz |
| 2010/0113162 A1 | 5/2010 | Vemuri et al. .................. 463/42 |
| 2010/0174593 A1 | 7/2010 | Cao |
| 2010/0198653 A1 | 8/2010 | Bromenshenkel |
| 2010/0210356 A1 | 8/2010 | Losica ............................ 463/26 |
| 2010/0227682 A1 | 9/2010 | Reville et al. |
| 2010/0228606 A1 | 9/2010 | Walker |
| 2010/0241491 A1 | 9/2010 | Eglen |
| 2010/0306015 A1 | 12/2010 | Kingston |
| 2011/0045898 A1 | 2/2011 | Anderson |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0212756 A1 | 9/2011 | Packard |
| 2011/0218033 A1 | 9/2011 | Englman et al. |
| 2011/0227919 A1 | 9/2011 | Bongio et al. |
| 2011/0250954 A1 | 10/2011 | Braund |
| 2011/0256936 A1 | 10/2011 | Walker et al. |
| 2011/0281638 A1 | 11/2011 | Bansi |
| 2011/0281654 A1* | 11/2011 | Kelly ................. G07F 17/3267 463/42 |
| 2011/0282764 A1 | 11/2011 | Borst |
| 2011/0300923 A1 | 12/2011 | Van Luchene |
| 2011/0319170 A1 | 12/2011 | Shimura et al. ................. 463/42 |
| 2012/0011002 A1 | 1/2012 | Crowe |
| 2012/0015714 A1 | 1/2012 | Ocko et al. |
| 2012/0015715 A1 | 1/2012 | Luxton et al. |
| 2012/0034961 A1 | 2/2012 | Berman et al. |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter et al. ............... 700/92 |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0130856 A1 | 5/2012 | Petri |
| 2012/0142429 A1 | 6/2012 | Muller |
| 2012/0156668 A1 | 6/2012 | Zelin ............................ 434/362 |
| 2012/0157187 A1 | 6/2012 | Moshal |
| 2012/0166380 A1 | 6/2012 | Sridharan |
| 2012/0166449 A1 | 6/2012 | Pitaliya ........................ 707/748 |
| 2012/0178514 A1 | 7/2012 | Schulzke |
| 2012/0178529 A1 | 7/2012 | Collard |
| 2012/0197874 A1 | 8/2012 | Zatkin |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas et al. |
| 2012/0231891 A1 | 9/2012 | Watkins, Jr. |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider et al. |
| 2012/0265604 A1 | 10/2012 | Corner |
| 2012/0282986 A1 | 11/2012 | Castro |
| 2012/0289315 A1 | 11/2012 | Van Luchene |
| 2012/0289346 A1 | 11/2012 | Van Luchene |
| 2012/0295699 A1 | 11/2012 | Reiche |
| 2012/0296716 A1 | 11/2012 | Barbeau |
| 2012/0302335 A1 | 11/2012 | Gregory-Brown |
| 2012/0309504 A1 | 12/2012 | Isozaki |
| 2012/0311504 A1 | 12/2012 | Van Os et al. |
| 2012/0322545 A1 | 12/2012 | Arnone et al. |
| 2012/0322561 A1 | 12/2012 | Kohlhoff |
| 2012/0329549 A1 | 12/2012 | Johnson |
| 2012/0330785 A1 | 12/2012 | Hamick et al. |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg et al. |
| 2013/0006736 A1 | 1/2013 | Bethke |
| 2013/0012304 A1 | 1/2013 | Cartwright |
| 2013/0013094 A1 | 1/2013 | Parks et al. |
| 2013/0013326 A1 | 1/2013 | Miller et al. |
| 2013/0013459 A1 | 1/2013 | Kerr |
| 2013/0029745 A1 | 1/2013 | Kelly et al. |
| 2013/0036064 A1 | 2/2013 | Osvald |
| 2013/0090173 A1 | 4/2013 | Kislyi |
| 2013/0090750 A1 | 4/2013 | Herrman et al. |
| 2013/0123005 A1 | 5/2013 | Allen et al. |
| 2013/0124361 A1 | 5/2013 | Bryson |
| 2013/0151342 A1 | 6/2013 | Citron et al. |
| 2013/0178259 A1 | 7/2013 | Strause et al. |
| 2013/0217453 A1 | 8/2013 | Briggs |
| 2013/0217489 A1 | 8/2013 | Bendayan |
| 2013/0226733 A1 | 8/2013 | Evans |
| 2013/0237299 A1 | 9/2013 | Bancel et al. |
| 2013/0244767 A1 | 9/2013 | Barclay et al. |
| 2013/0260850 A1 | 10/2013 | Carpe |
| 2013/0288757 A1 | 10/2013 | Guthridge |
| 2013/0288787 A1 | 10/2013 | Yoshie |
| 2013/0303276 A1 | 11/2013 | Weston et al. |
| 2013/0303726 A1 | 11/2013 | Mozzarelli |
| 2013/0324259 A1 | 12/2013 | Mccaffrey |
| 2013/0339111 A1 | 12/2013 | Ross |
| 2013/0339228 A1 | 12/2013 | Shuster |
| 2013/0344932 A1 | 12/2013 | Adams et al. |
| 2014/0004884 A1 | 1/2014 | Chang |
| 2014/0011565 A1 | 1/2014 | Elias |
| 2014/0018156 A1 | 1/2014 | Rizzotti et al. |
| 2014/0033262 A1 | 1/2014 | Anders |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0157314 A1 | 6/2014 | Roberts |
| 2014/0180725 A1 | 6/2014 | Ton-That |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |

(56) References Cited

U.S. PATENT DOCUMENTS

| | | | |
|---|---|---|---|
| 2014/0309026 A1 | 10/2014 | Inukai |
| 2014/0329585 A1 | 11/2014 | Santini |
| 2014/0337259 A1 | 11/2014 | Lamb |
| 2015/0011305 A1 | 1/2015 | Deardorff |
| 2015/0019349 A1 | 1/2015 | Milley |
| 2015/0065241 A1 | 3/2015 | McCarthy |
| 2015/0065256 A1 | 3/2015 | Cudak |
| 2015/0273320 A1 | 10/2015 | Pieron |
| 2015/0306494 A1 | 10/2015 | Pieron |
| 2015/0335995 A1 | 11/2015 | Mclellan |
| 2015/0352436 A1 | 12/2015 | Pieron |
| 2016/0121219 A1 | 5/2016 | Kim |
| 2016/0236094 A1 | 8/2016 | Pieron |
| 2016/0361654 A1 | 12/2016 | Pieron |

FOREIGN PATENT DOCUMENTS

| | | |
|---|---|---|
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

PCT International Search Report and Written Opinion for PCT/US2016/017637 dated Apr. 7, 2016, 12 pages.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

City Coins. CityVille Wikia. Online. Accessed via the Internet. Accessed Aug. 9, 2014. <URL: http://cityville.wikia.com/wiki/City_Coins>, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do >, Apr. 23, 2014, 9 pages.

"Behavioural Analytics & Campaigning", http://lotaris.com/behavioural._analytics_and._Campaigning.htm, screenshot access date May 24, 2012 2:21 PM, 1 page.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . . , posted San Francisco, Mar. 27, 2012 (Business Wire), 8:30 a.m. EDT, printed May 24, 2012 2:32 PM, 3 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

TFWiki "teamfortress wiki" available Nov. 5, 2011 retrieved from https://web.archive.org/web/20111105044256/http://wiki.teamfortress.com/wiki/Loadout, 4 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_--_Part_2&oldid=399366>, <http://lotrowiki.com/index.php?title=Getting_Started&oldid=349681 >. Links are to used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).

"A Wondrous Drop Event and Double EXP", [dated Aug. 22, 2012]. From flyff-wiki. [online], [retrieved on Jan. 12, 2016]. Retrievedfrom the Internet <URL:http://flyff-wiki.webzen.com/wiki/A_Wondrous_Drop_Event_and_Double_EXP>. 2 pages.

"Flyff", [dated May 25, 2013]. From Wikipedia, The Free Encylopedia. [on line], [retrieved on Jan. 12, 2016]. Retrieved from the Internet<URL:https://en.wikipedia.org/w/index.php?title=Flyff&oldid=556751091 >. 4 pages.

"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll_of_Amplification_R>. 3 pages.

Elsword—Wikipedia, the free encyclopedia, URL: en.wikipedia.org/wiki/Elsword [Retrieved Feb. 21, 2013], 6 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.

\* cited by examiner

Create a Contest

Contest Name — 202

Start Date/Time — 204
End Date/Time — 206

Eligibility Qualification(s) (Multiple-Select) — 208

Performance Criteria (Multiple-Select) — 210

Awards to be Distributed (Multiple-Select) — 212

Value(s)
(Input Boxes Will Appear As Necessary for Each Selected Qualification, Performance Criteria, or Award) — 214

Submit

INTERFACE-BASED GAME-SPACE CONTEST GENERATION

FIELD OF THE DISCLOSURE

This disclosure relates generally to interface-based game-space contest generation.

BACKGROUND

Traditionally, configuration of a contest is performed by engineers to manually code changes to the backend to execute the contest. Typically, at the end of a contest, administrators manually judge the performance of participating users of the contest, for instance, by evaluating contest activities performed by those users, by comparing scores computed for those users, etc. In addition, the administrators often manually distribute the contest awards based on their judging. Among other issues, these conventional techniques may be associated with human-related errors (e.g., judging errors, awarding errors, etc.) along with delays in award distribution, resulting in user dissatisfaction with the contest experience, higher volume of support calls, and/or other drawbacks.

SUMMARY

One aspect of the disclosure relates to a system configured to facilitate interface-based game-space contest generation, in accordance with one or more implementations. In exemplary implementations, one or more performance criteria to be associated with a contest to be provided in a game space, one or more awards to be distributed in association with the contest, one or more qualifications to participate in the contest, and/or other contest-related user inputs may be received via a user interface. Based on these user inputs, a notification that relates to the contest may be provided in the game space. Contest-related activities that are performed in the game space by the users participating in the contest may be monitored. Performance scores of the participating users may be determined based on the performance criteria and the performed activities. The awards may be automatically distributed to individual ones of the participating users in accordance with the performance scores of the individual participating users. In this way, interface-based game-space contest generation may decrease human-related errors (e.g., by providing more accurate performance scoring of performed contest-related activities, awarding the right participating users, etc.), reduce award distribution delays (e.g., by determining the award winners more quickly, distributing the awards upon such determination, etc.), improve user experience relating to such contests, lower the number of support calls, and/or provide other benefits.

In some implementations, the system may include one or more servers. The server(s) may be configured to communicate with one or more client computing platforms according to a client/server architecture. The users may access the system via the client computing platforms, for instance, to interact with one or more services.

The server(s) may be configured to execute one or more computer program modules to facilitate interface-based game-space contest generation. The computer program modules may include one or more of a template interface module, a contest implementation module, a performance determination module, an award distribution module, and/or other modules. In some implementations, the client computing platforms may be configured to execute one or more computer program modules that are the same as or similar to the computer program modules of the server(s) to facilitate interface-based game-space contest generation.

The template interface module may be configured to provide a user interface configured to receive user inputs that include one or more performance criteria to be associated with a contest to be provided in a game space, one or more awards to be distributed in association with the contest, one or more qualifications to participate in the contest, and/or other user inputs. The template interface module may be configured to provide the user interface to an administrator to receive the user inputs from the administrator via the user interface. The game space may be configured to facilitate interaction of users with the game space and/or each other by performing operations in the game space in response to commands received from the users.

In certain implementations, the performance criteria may relate to success with respect to the contest to be provided in the game space. The success-related performance criteria may relate to one or more of resource collection, building possession, combat, rescues, or level progress.

In some implementations, the qualifications to participate in the contest may include merit-based qualifications associated with the game space. The merit-based qualifications may relate to one or more of possessed structures, collected resources, combat history, rescue history, or user level.

The contest implementation module may be configured to provide, based on the user inputs, a notification in the game space that relates to the contest. For example, the notification may be provided based on the performance criteria to be associated with the contest, the awards to be distributed in association with the content, and/or the qualifications to participate in the contest that are received as one or more of the user inputs. In various implementations, for instance, the notification may indicate one or more of the users that are qualified to enter the contest based on the qualifications to participate in the contest. In some implementations, the notification may indicate the performance criteria, the awards, and/or the qualifications.

In certain implementations, the contest implementation module may execute the contest in the game space based on the user inputs. The performance determination module may be configured to determine, based on the performance criteria and activities that are performed in the game space by the users that participated in the contest, performance scores of the participating users. The award distribution module may be configured to facilitate automated distribution of the awards to individual ones of the participating users in accordance with the performance scores of the individual participating users.

In various implementations, the award distribution module may be configured such that at least one of the awards is distributed to at least one of the participating users in response to the performance scores of the at least one participating user satisfying one or more performance thresholds.

In certain implementations, the award distribution module may be configured such that the awards are distributed based on one or more predetermined intervals of the contest. In some implementations, the award distribution module may be configured such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

In certain implementations, the template interface module may be configured to store a template that indicates the user inputs. As such, in some implementations, the contest may be executed in the game space based on the stored template. The contest may, for instance, be executed based on a predetermined schedule, a periodic basis, a manual user activation, and/or other trigger using the user inputs indicated in the stored template.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates a diagram of a user interface for receiving user inputs relating to a contest, in accordance with one or more implementations.

DETAILED DESCRIPTION

Figure 1:
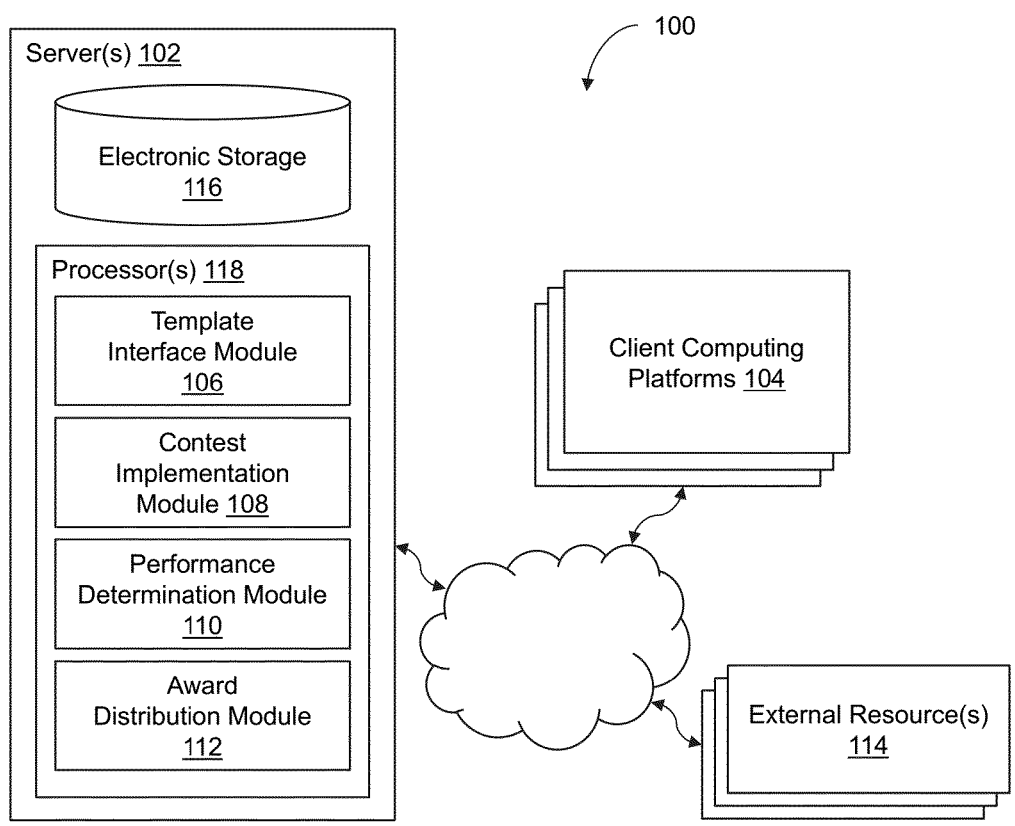
FIG. 1 illustrates a system configured to facilitate interface-based game-space contest generation, in accordance with one or more implementations.

FIG. 1 illustrates a system 100 configured to facilitate interface-based game-space contest generation, in accordance with one or more implementations. In exemplary implementations, user inputs that relate to a contest to be provided in a game space may be received via a user interface. The user inputs may include one or more performance criteria to be associated with the contest, one or more awards to be distributed in association with the contest, one or more qualifications to participate in the contest, and/or other contest-related user inputs. A notification that relates to the contest may be provided, based on the user inputs, in the game space. Contest-related activities that are performed in the game space by the users participating in the contest may be monitored. Performance scores of the participating users may be determined based on the performance criteria and the performed activities. The awards may be automatically distributed to individual ones of the participating users in accordance with the performance scores of the individual participating users. In this way, interface-based game-space contest generation may decrease human-related errors (e.g., by providing more accurate performance scoring of performed contest-related activities, awarding the right participating users, etc.), reduce award distribution delays (e.g., by determining the award winners more quickly, distributing the awards upon such determination, etc.), and/or provide other benefits.

In some implementations, system 100 may include one or more servers 102. Server(s) 102 may be configured to communicate with one or more client computing platforms 104 according to a client/server architecture. The users may access system 100 via client computing platforms 104, for instance, to interact with one or more services.

Server(s) 102 may be configured to execute one or more computer program modules to facilitate interface-based game-space contest generation. The computer program modules may include one or more of a template interface module 106, a contest implementation module 108, a performance determination module 110, an award distribution module 112, and/or other modules. In some implementations, client computing platforms 104 may be configured to execute one or more computer program modules that are the same as or similar to the computer program modules of server(s) 102 to facilitate interface-based game-space contest generation.

Template interface module 106 may be configured to provide a user interface configured to receive user inputs that include one or more performance criteria to be associated with a contest to be provided in a game space, one or more awards to be distributed in association with the contest, one or more qualifications to participate in the contest, and/or other user inputs. Template interface module 106 may be configured to provide the user interface to an administrator to receive the user inputs from the administrator via the user interface.

Along these lines, FIG. 2 illustrates a diagram of a user interface 200 for receiving user inputs relating to a contest, in accordance with one or more implementations. As shown, user interface 200 enables an administrator to create a contest by entering a contest name, start/end dates and times, eligibility qualifications to be a participating user, performance criteria that can be used to assess success with respect to the contest, awards to be distribution in association with the contest, values that may be associated with selected qualifications, performance criteria, or awards, and/or other contest-related user inputs. These user inputs may, for instance, be provided by the administrator via input fields 202, 204, 206, 208, 210, 212, and 214. In one use case, the administrator may select multiple performance criteria from the drop-drop menu of input field 210. One or more corresponding input fields 214 may appear in response to the multiple selections to enable the administrator to enter, if necessary, values associated with one or more of the multiple selections (e.g., to indicate an contest activity that a performance criteria is associated with, to indicate a threshold for the performance criteria, etc.). Upon entering the user inputs, the administrator may activate the "Submit" button to initiate creation of the contest, to be provided with further options (e.g., selecting activities for the contest, saving of the contest as a template that includes the user inputs, etc.). As used herein, an administrator may include a user that has access rights to create, modify, activate, deactivate, or remove contests.

As such, in certain implementations, the performance criteria may relate to success with respect to the contest to be provided in the game space. The success-related performance criteria may relate to one or more of resource collection, building possession, combat (e.g., between user characters and/or non-user characters), rescues (e.g., of user characters and/or non-user characters), level progress, and/or other game-space features. For example, with respect to FIG. 2, the performance criteria that can be selected via input field 210 may include criteria to assess whether a participating user will be distributed a contest award (e.g., when assessed individually, when compared with other participating users, etc.). These criteria may, for instance, relate to an amount of, specific types, or particular ones of: (1) resources that the participating user may be required to collect; (2) buildings that the participating user needs to conquer or possess; (3) combats or rescues that the participating user needs to attempt, win, or complete; and/or (4) progress with respect to levels that the participating user needs to achieve (e.g., user level, building level, research level, etc.). As another example, other such criteria may relate to an amount of, specific types, or particular ones of: (1) sales that the participating user needs to make; (2) purchases that the participating user needs to make; (3) items that the participating user needs to collect or use; (4) currency that the participating user needs to purchase or spend; (5) length of gameplay that the participating user needs to achieve; (6) characters with which the participating user needs to interact; (7) alliances that the participating user needs to join; (8) logins that the participating user needs to initiate; or (8) other objectives to achieve.

In some implementations, the qualifications to participate in the contest may include merit-based qualifications associated with the game space. The merit-based qualifications may relate to one or more of possessed structures, collected resources, combat history, rescue history, user level, and/or other game-space features. For example, with respect to FIG. 2, the qualifications that can be selected via input field 208 may include qualifications relating to user achievements in the game space. A user may, for instance, be qualified to participate in a contest by achieving certain goals before a qualification deadline, such as: (1) collecting an amount of, a specific type of, or a particular resource(s); (2) conquering or possessing an amount of, a specific type of, or a particular building(s); (3) winning or completing an amount of, a specific type of, or a particular combat(s) or rescue(s); and/or (4) reaching a certain level in the game space (e.g., user level, building level, research level, etc.). As another example, other qualifications may relate to an amount of, specific types, or particular ones of: (1) sales that a user needs to make; (2) purchases that the user needs to make; (3) items that the user needs to collect or use; (4) length of gameplay of the user; (5) characters with which the user needs to interact; (6) currency that the user needs to purchase or spend; (6) alliances that the user needs to join; (7) logins that the user needs to initiate; or (8) other achievements.

In various implementations, the qualifications to participate in the contest may include non-merit-based qualifications. The non-merit-based qualifications may include contest participation fees, user age requirements, server requirements (e.g., a contest may be limited to users with accounts hosted on particular servers), location requirements (e.g., the contest may be limited to users with characters in particular areas of the game space, users located in particular areas of the real world, etc.), or other non-merit-based qualifications.

In some implementations, the game space may be a virtual space. An instance of the game space may be an instance of the virtual space. A space module may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from the space module. Expressions of the instance executed on the clients may include space logic that effectively provides for execution of a limited version of the instance on a client that is synchronized and/or verified with state information received from the space module. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by the space module is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through a space module).

Contest implementation module 108 may be configured to provide, based on the user inputs, a notification in the game space that relates to the contest. For example, the notification may be provided based on the performance criteria to be associated with the contest, the awards to be distributed in association with the content, and/or the qualifications to participate in the contest that are received as one or more of the user inputs. In various implementations, for instance, the notification may indicate one or more of the users that are qualified to enter the contest based on the qualifications to participate in the contest. In some implementations, the notification may indicate the performance criteria, the awards, and/or the qualifications. In this way, users of the game space may be informed of the contest, be incentivized to participate in the contest (e.g., in response to the notification of the awards), become more engaged in the game space (e.g., to become qualified to participate in the contest before a qualification deadline), and/or provide other benefits.

Figure 3:
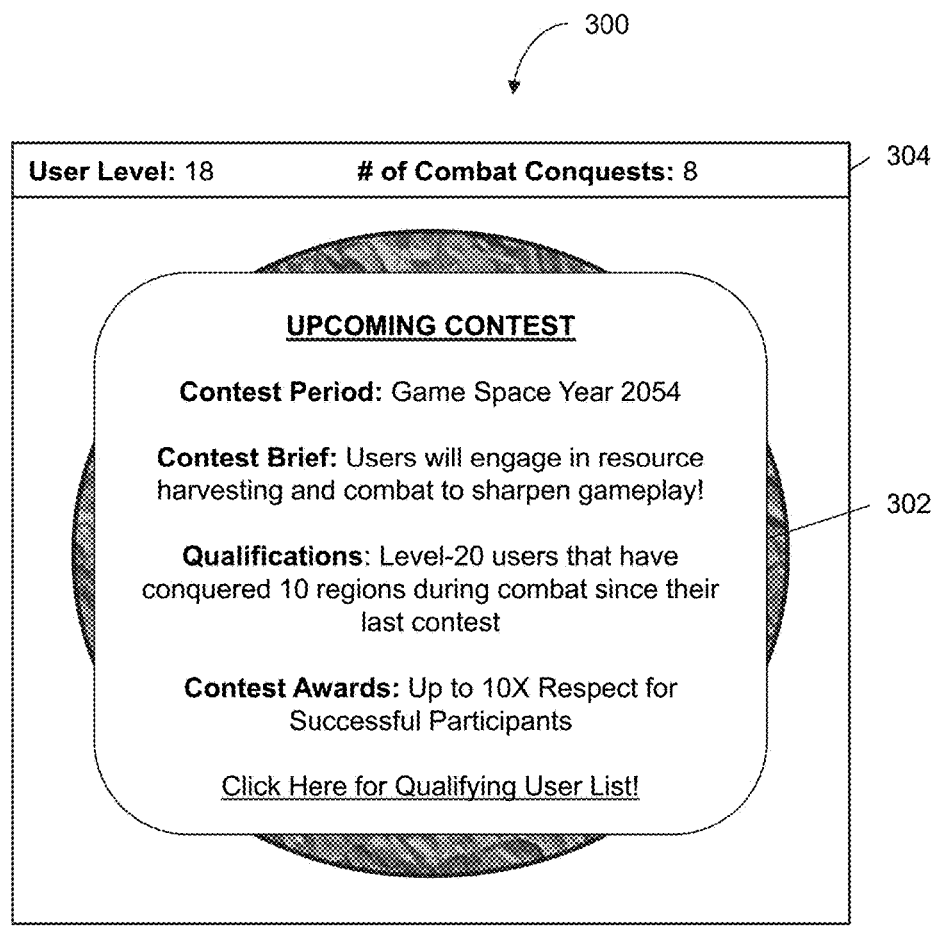
FIG. 3 illustrates a diagram of a user interface depicting a notification relating to a contest, in accordance with one or more implementations.

By way of example, FIG. 3 illustrates a diagram of a user interface 300 depicting a notification 302 relating to a contest, in accordance with one or more implementations. As shown, user interface 300 includes a status bar 304 to indicate a user's level, a number of combat conquests since a previous contest, and/or other information to the user. User interface 300 may utilized to present notification 302 to inform the user of the contest period, a brief summary of the contest, qualifications to be eligible to participate in the contest, contest awards to be distributed in association with the contest, and a link to a list of qualifying users that may participate in the contest. Notification 302 may be generated based on the user inputs entered by an administrator via input fields 202, 204, 206, 208, 210, 212, and 214 of user interface 200 that is shown in FIG. 2. In one use case, the link to the list of qualifying users in notification 302 may be generated based on the qualifications selected by the administrator via input field 208 and the associated values entered in input fields 214. In another use case, notification 302 may specify the qualifying users in lieu of the link to the list, inform the user whether he/she is one of the qualifying users, and/or provide other information relating to the qualifications.

In certain implementations, contest implementation module 108 may execute the contest in the game space based on the user inputs. In one scenario, content implementation module 108 may set the contest period to be from the user-inputted start date/time until the user-inputted end date/time. As an example, activities of the contest may be made available to the participating users during the contest period. As another example, activities of the contest may be activities that can be performed by users (without regard to the contest) in the game space but those activities may be monitored for the participating users in association with the contest during the contest period to determine performance scores of the participating users that perform the activities. Contest-related activities may include collecting resources, constructing or otherwise obtaining buildings, engaging in combat, performing rescues, selling merchandise, collecting items, and/or other activities. In another scenario, user-inputted awards may be distributed to the participating users throughout the duration of the contest period, at the end of the contest period, or at other times in accordance with the determined performance scores of the participating users.

As such, performance determination module 110 may be configured to determine, based on the performance criteria and activities that are performed in the game space by the users that participated in the contest, performance scores of the participating users. Award distribution module 112 may be configured to facilitate automated distribution of the awards to individual ones of the participating users in accordance with the performance scores of the individual participating users. For example, in one use case, the activity may be collecting a specific type of resource (e.g., diamond, gold, silver, platinum, iron, wheat, etc.) and the performance criteria may include having the most amounts of the specific type of resource collected during the contest period. As such, participating users that have collected more of the specific type of the resource than other participating users during the contest period may be assigned higher performance score than those other participating users. Thus, awards may be automatically distributed to a certain number of the participating users that collect the most amounts of the specific type of resource during the contest period (e.g., at the end of the contest period, at one or more intervals during the contest period, etc.). The awards may include virtual items, virtual currency, buildings, resources, access to other contests, access to regions in the game space, access to activities in the game space, respect, multipliers (e.g., 10× respect), level increase, and/or other awards.

In various implementations, award distribution module 112 may be configured such that at least one of the awards is distributed to at least one of the participating users in response to the performance scores of the at least one participating user satisfying one or more performance thresholds. By way of example, a particular contest in the game space may provide awards to participating users that satisfy a certain performance threshold. In one use case, the particular contest may be configured such that a participating user may be provided with an award associated with the contest if the participating user harvests a specific predetermined amount of resources during the contest period (e.g., harvesting 5000 units of wood, harvesting 2000 units of wheat, etc.). The participating user may, for instance, be provided with the award during or after the contest period in response to determining that the participating user satisfied the specific resource harvesting threshold during the contest period.

In another use case, the participating user may be provided with multiple awards for satisfying multiple performance thresholds. For example, the participating user may be provided with one award after the participating user harvests a first amount of resources (e.g., 5000 units of wood) during the contest period, and a different award after the participating user harvests a second amount of resources (e.g., 12,000 units of wood). In this way, users may be provided with a plurality of incentives to sign up, participate, and/or continue to participate in the game-space contest. The awards may, for instance, be automatically distributed to the participating user in real-time as soon as the participating user completes each set of activities to satisfy the performance thresholds. As such, wait time associated with distribution of the awards may be eliminated or otherwise reduced.

In certain implementations, award distribution module 112 may be configured such that the awards are distributed based on one or more predetermined intervals of the contest. By way of example, a particular contest may last for a period of one week, each day of the contest may represent one time interval of the contest, and award distribution module 112 may be configured to distribute the awards at the end of each day to individual participating users that are determined to have satisfied one or more performance thresholds.

In some implementations, award distribution module 112 may be configured such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

In one scenario, a particular contest in the game space may last for a period of one week, and each day of the contest may represent one time interval of the contest. The contest may provide awards to participating users for each day that the participating users perform activities that satisfy a performance threshold. For example, a participating user may be provided with 1000 units of wood when the participating user logs into the game space on the first day of the contest (e.g., logging into the game space may be a predefined activity for satisfying a performance threshold). The participating user may be provided with 1500 units of iron when the participating user logs into the game space on the second day of the contest. The participating user may be provided with 2000 units of wheat when the participating user logs into the game space on the third day of the contest, and so on. In this way, among other benefits, contests may enable participating users to develop habits based on the predefined activities (e.g., logging in on a regular basis), encourage a steady stream of activities by participating users, etc.

In various implementations, template interface module 106 may be configured to store a template that indicates the user inputs. As such, in some implementations, the contest may be executed in the game space based on the stored template. The contest may, for instance, be executed based on a predetermined schedule, a periodic basis, a manual user activation, and/or other trigger using the user inputs indicated in the stored template. In one scenario, a game-space contest created via interface-based game-space contest generation that attracted a substantial number of participating users may be reinitiated so that the contest may be repeated in accordance with a predetermined schedule or via a manual user activation of the contest by using the template to provide the user inputs for the contest.

Server(s) 102, client computing platforms 104, external resources 114, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 114, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 114, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 114 may include sources of information, hosts and/or providers of virtual spaces outside of system 100, external entities participating with system 100, and/or other resources. In some implementations, some or all of the functionality attributed herein to external resources 114 may be provided by resources included in system 100.

In some implementations, server(s) 102 may include an electronic storage 116, one or more processor(s) 118, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may include electronic storage media that electronically stores information. In some implementations, the electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing platforms 104, and/or other information that enables server(s) 102 and/or client computing platforms 104 to function as described herein. It should be noted that, in certain implementations, electronic storage 116 may be a part of server(s) 102, a part of a given client computing platform 104, and/or a separate component of system 100.

In some implementations, processor(s) 118 is configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units. These processing units may be physically located within the same device, or processor(s) 118 may represent processing functionality of a plurality of devices operating in coordination. Processor(s) 118 may be configured to execute modules 106, 108, 110, 112, and/or other modules. Processor(s) 118 may be configured to execute modules 106, 108, 110, 112, and/or other modules by software; hardware; firmware; some combination of software, hardware, and/or firmware; and/or other mechanisms for configuring processing capabilities on processor(s) 118. As noted, in certain implementations, a given client computing platform 104 may include one or more computer program modules that is the same as or similar to the computer program modules of server(s) 102. Client computing platform 104 may include one or more processors that are the same or similar to processor(s) 118 of server(s) 102 to execute such computer program modules of client computing platform 104.

It should be appreciated that although modules 106, 108, 110, and 112 are illustrated in FIG. 1 as being co-located within a single processing unit, in implementations in which processor(s) 118 includes multiple processing units, one or more of modules 106, 108, 110, and/or 112 may be located remotely from the other modules. The description of the functionality provided by the different modules 106, 108, 110, and/or 112 described below is for illustrative purposes, and is not intended to be limiting, as any of modules 106, 108, 110, and/or 112 may provide more or less functionality than is described. For example, one or more of modules 106, 108, 110, and/or 112 may be eliminated, and some or all of its functionality may be provided by other ones of modules 106, 108, 110, and/or 112. As another example, processor(s) 118 may be configured to execute one or more additional modules that may perform some or all of the functionality attributed below to one of modules 106, 108, 110, and/or 112.

Figure 4:
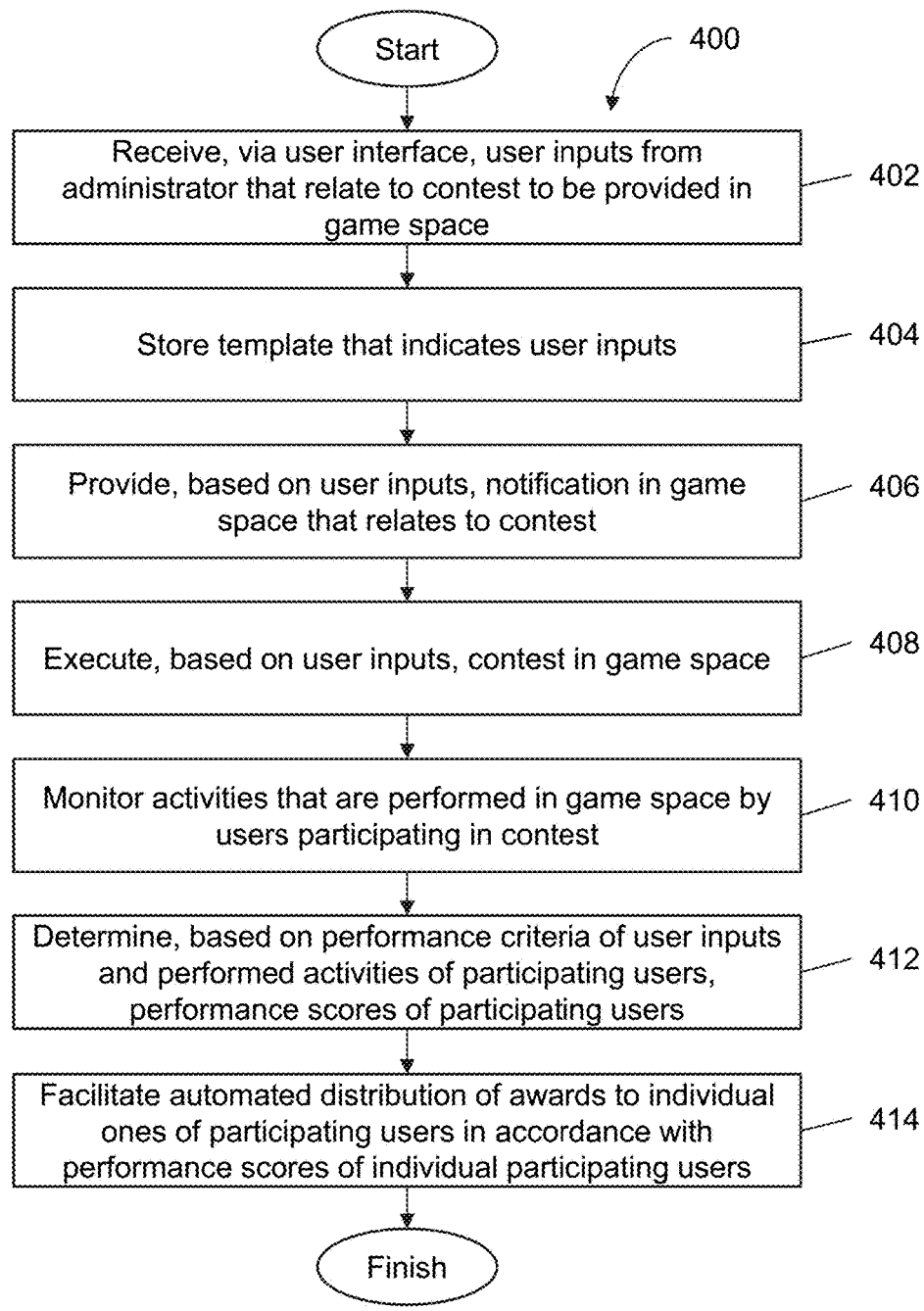
FIG. 4 illustrates a method for facilitating interface-based game-space contest generation, in accordance with one or more implementations.

FIG. 4 illustrates a method for facilitating interface-based game-space contest generation, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, user inputs that relate to a contest to be provided in a game space may be received from an administrator via a user interface. The user inputs may include one or more performance criteria to be associated with the contest, one or more awards to be distributed in association with the contest, one or more qualifications to participate in the contest, and/or other user inputs. The game space may be configured to facilitate interaction of users with the game space and/or each other by performing operations in the game space in response to commands received from the users. In certain implementations, the performance criteria may relate to success with respect to the contest. The success-related performance criteria may relate to one or more of resource collection, building possession, combat, rescues, or level progress. In some implementations, the qualifications include merit-based qualifications associated with the game space. The merit-based qualifications may relate to one or more of possessed structures, collected resources, combat history, rescue history, or user level. Operation 402 may be performed by a template interface module that is the same as or similar to template interface module 106, in accordance with one or more implementations.

At an operation 404, a template that indicates the user inputs may be stored. As such, in some implementations, the contest may be executed in the game space based on the stored template. The contest may, for instance, be executed based on a predetermined schedule, a periodic basis, a manual user activation, and/or other trigger using the user inputs indicated in the stored template. Operation 404 may be performed by a template interface module that is the same as or similar to template interface module 106, in accordance with one or more implementations.

At an operation 406, a notification that relates to the contest may be provided in the game space based on the user inputs. For example, the notification may be provided based on the performance criteria, the awards, and/or the qualifications that are received as user inputs from the administrator via the user interface. In some implementations, the notification may indicate one or more of the users that are qualified to enter the contest. Operation 406 may be performed by a contest implementation module that is the same as or similar to contest implementation module 108, in accordance with one or more implementations.

At an operation 408, the contest may be executed in the game space based on the user inputs. For example, the contest may be executed based on the performance criteria, the awards, and/or the qualifications that are received as user inputs from the administrator via the user interface. Operation 408 may be performed by a contest implementation module that is the same as or similar to contest implementation module 108, in accordance with one or more implementations.

At an operation 410, activities that are performed in the game space by the users participating in the contest may be monitored. Operation 410 may be performed by a performance determination module that is the same as or similar to performance determination module 110, in accordance with one or more implementations.

At an operation 412, performance scores of the participating users may be determined based on the performance criteria and the performed activities of the participating users. Operation 412 may be performed by a performance determination module that is the same as or similar to performance determination module 110, in accordance with one or more implementations.

At an operation 414, automated distribution of the awards to individual ones of the participating users may be facilitated in accordance with the performance scores of the individual participating users. Operation 414 may be performed by an award distribution module that is the same as or similar to award distribution module 112, in accordance with one or more implementations.

In certain implementations, with respect to operation 414, the automated distribution may be facilitated such that the awards are distributed to the individual participating users based on one or more predetermined intervals of the contest. In some implementations, the automated distribution may be facilitated such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system for facilitating generation and execution of contests for an online game to be provided in a game space in which the online game is played, wherein the generation includes providing a user interface to an administrator of the contests, and wherein the game space is configured to facilitate interaction of users with the game space and/or each other by performing operations in the game space to achieve one or more game objectives in response to commands received from client computing platforms associated with the users, the system comprising:

one or more processors configured by machine-readable instructions to:
provide the user interface for presentation to the administrator, wherein the user interface is configured to receive user inputs from the administrator that indicate:
(i) one or more performance criteria to be associated with one or more contests for the online game to be provided in the game space in which the online game is played,
(ii) one or more awards to be distributed in association with the one or more contests, wherein the one or more awards include virtual items usable in the game space,
(iii) one or more qualifications to participate in the one or more contests, and
(iv) one or both of a predetermined schedule and a trigger for initiating individual contests in the one or more contests, and
wherein the user interface is further configured to receive an activation user input from the administrator to initiate the one or more contests,
wherein the users participate in ongoing gameplay within the game space by inputting commands that are transmitted over a network to the one or more processors via the client computing platforms associated with the users such that the users that participate in the one or more contests continue to participate in the ongoing gameplay during the one or more contests;
store a contest template that indicates the user inputs;
responsive to receipt of the activation user input from the administrator to initiate the one or more contests, provide, based on the contest template, a notification in the game space that invites participation to the one or more contests, wherein the notification is provided to one or more users that are qualified to participate in the one or more contests in light of the one or more qualifications;
determine, based on the performance criteria and activities that are performed in the game space by the users that participated in the one or more contests, performance scores of the participating users, wherein the activities can be performed by the users in the game space without regard to their participation in the one or more contests such that the activities are performed during the one or more contests by both the users that participated in the one or more contests and by one or more users that did not participate in the one or more contests,
wherein determining the performance scores of the participating users includes monitoring the activities of the one or more contests that are performed by the users that participated in the one or more contests, and
wherein the performance criteria and the activities that are performed in the game space, that contribute to the determination of the performance scores of the participating users in the one or more contests, are the same performance criteria and activities performed by the users when performing operations in the game space to achieve one or more game objectives of the ongoing gameplay, wherein the performance criteria include one or more of resource collection, building possession, rescues, or level progress such that the users' resource collection, building possession, recues, or level progress while the user is participating in the one or more contests also impact the user's achievement of the one or more game objectives of the ongoing gameplay within the game space; and
automatically distribute the awards to individual ones of the participating users in accordance with the performance scores of the individual participating users.

2. The system of claim 1, wherein the performance criteria relate to success with respect to the one or more contests.

3. The system of claim 1, wherein the qualifications include merit-based qualifications associated with the game space earned separately from the one or more contests and prior to a contest period that defines one or more durations of availability of the one or more contests, wherein the one or more durations correspond to the one or more contests.

4. The system of claim 3, wherein the merit-based qualifications relate to one or more of possessed buildings, collected resources, combat history, rescue history, or levels associated with the game space.

5. The system of claim 1, wherein the one or more processors are configured by machine-readable instructions such that the notification indicates one or more of the users that are qualified to participate in the one or more contests based on the qualifications.

6. The system of claim 1, wherein the one or more processors are configured by machine-readable instructions to automatically and repeatedly initiate additional contests by providing notifications to qualified users, determining the performance scores, and distributing the awards, wherein initiation of the additional contests is based on the contest template and in accordance with one or both of the predetermined schedule and the trigger as indicated by the user input received from the administrator.

7. The system of claim 1, wherein the one or more processors are configured by machine-readable instructions such that at least one of the awards is distributed to at least one of the participating users in response to the performance scores of the at least one participating user satisfying one or more performance thresholds.

8. The system of claim 1, wherein the user inputs received from the administrator further indicate one or more predetermined intervals of the one or more contests, wherein the one or more processors are configured by machine-readable instructions such that the awards are distributed to the individual participating users based on the one or more predetermined intervals of the one or more contests.

9. The system of claim 8, wherein the one or more processors are configured by machine-readable instructions such that a first award of the awards is distributed during a first predetermined interval of the predetermined intervals to a first participating user of the participating users in response to the performance scores of the first participating user satisfying a first performance threshold during the first predetermined interval, and such that a second award of the awards is distributed during a second predetermined interval of the predetermined intervals to the first participating user in response to the performance scores of the first participating user satisfying a second performance threshold during the second predetermined interval.

10. A computer-implemented method of facilitating generation and execution of contests to be provided in a game space, wherein the generation includes providing a user interface to an administrator of the contests, and wherein the game space facilitates interaction of users with the game space and/or each other by performing operations in the game space to achieve one or more game objectives in response to commands received from the users, the method being implemented on a computer system that includes one or more physical processors, the method comprising:
  providing the user interface for presentation to the administrator, wherein the user interface receives user inputs from the administrator that indicate:
    (i) one or more performance criteria to be associated with one or more contests for the online game to be provided in the game space in which the online game is played,
    (ii) one or more awards to be distributed in association with the one or more contests, wherein the one or more awards include virtual items usable in the game space,
    (iii) one or more qualifications to participate in the one or more contests, and
    (iv) one or both of a predetermined schedule and a trigger for initiating individual contests in the one or more contests, and
  wherein the user interface further receives an activation user input from the administrator to initiate the one or more contests,
  wherein the users participate in ongoing gameplay within the game space by inputting commands that are transmitted over a network to the one or more processors via the client computing platforms associated with the users such that the users that participate in the one or more contests continue to participate in the ongoing gameplay during the one or more contests;
  storing a contest template that indicates the user inputs;
  responsive to receipt of the activation user input from the administrator to initiate the one or more contests, providing, based on the contest template, a notification in the game space that invites participation to the one or more contests, wherein the notification is provided to one or more users that are qualified to participate in the contest in light of the one or more qualifications;
  determining, based on the performance criteria and activities that are performed in the game space by the users that participated in the one or more contests, performance scores of the participating users,
  wherein the activities can be performed by the users in the game space without regard to their participation in the one or more contests such that the activities are performed during the one or more contests by both the users that participated in the one or more contests and by one or more users that did not participate in the one or more contests, the one or more users that did not participate in the one or more contests including a non-qualified user that is not qualified to participate in the one or more contests in light of the one or more qualifications,
  wherein determining the performance scores of the participating users includes monitoring the activities of the one or more contests that are performed by the users that participated in the one or more contests, and
  wherein the performance criteria and activities that are performed in the game space, that contribute to the determination of the performance scores of the participating users in the one or more contests, are the same performance criteria and activities performed by the users when performing operations in the game space to achieve one or more game objectives of the ongoing gameplay, wherein the performance criteria include one or more of resource collection, building possession, rescues, or level progress such that the users' resource collection, building possession, recues, or level progress while the user is participating in the one or more contests also impact the user's achievement of the one or more game objectives of the ongoing gameplay within the game space; and
  distributing automatically the awards to individual ones of the participating users in accordance with the performance scores of the individual participating users.

11. The method of claim 10, wherein the performance criteria relate to success with respect to the one or more contests.

12. The method of claim 10, wherein the qualifications include merit-based qualifications associated with the game space earned separately from the one or more contests and prior to a contest period that defines one or more durations of availability of the one or more contests, wherein the one or more durations correspond to the one or more contests.

13. The method of claim 12, wherein the merit-based qualifications relate to one or more of possessed buildings, collected resources, combat history, rescue history, or levels associated with the game space.

14. The method of claim 10, wherein the notification indicates one or more of the users that are qualified to participate in the one or more contests based on the qualifications.

15. The method of claim 10, further comprising:
automatically and repeatedly initiating additional contests by providing notifications to qualified users, determining the performance scores, and distributing the awards, wherein initiation of the additional contests is based on the contest template and in accordance with one or both of the predetermined schedule and the trigger as indicated by the user input received from the administrator.

16. The method of claim 10, further comprising facilitating automated distribution of at least one of the awards to at least one of the participating users in response to the performance scores of the at least one participating user satisfying one or more performance thresholds.

17. The method of claim 10, wherein the user inputs received from the administrator further indicate one or more predetermined intervals of the one or more contests, the method further comprising facilitating, based on the one or more predetermined intervals of the one or more contests, the automated distribution of the awards to the individual participating users.

18. The method of claim 17, further comprising:
facilitating automated distribution of a first award of the awards during a first predetermined interval of the predetermined intervals to a first participating user of the participating users in response to the performance scores of the first participating user satisfying a first performance threshold during the first predetermined interval; and
facilitating automated distribution of a second award of the awards during a second predetermined interval of the predetermined intervals to the first participating user in response to the performance scores of the first participating user satisfying a second performance threshold during the second predetermined interval.

* * * * *